United States Patent
Mashiko et al.

(10) Patent No.: US 7,167,833 B2
(45) Date of Patent: Jan. 23, 2007

(54) CONFERENCE MANAGEMENT ASSISTANCE APPARATUS AND CONFERENCE MANAGEMENT ASSISTANCE PROGRAM

(75) Inventors: Junichi Mashiko, Kawasaki (JP); Junichi Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 13 days.

(21) Appl. No.: 10/734,253

(22) Filed: Dec. 15, 2003

(65) Prior Publication Data

US 2004/0128179 A1 Jul. 1, 2004

Related U.S. Application Data

(63) Continuation of application No. PCT/JP01/05029, filed on Jun. 13, 2001.

(51) Int. Cl.
G06F 9/46 (2006.01)
(52) U.S. Cl. ............................... 705/9; 705/8
(58) Field of Classification Search ............ 705/8, 705/9
See application file for complete search history.

(56) References Cited

U.S. PATENT DOCUMENTS 5,303,145 A * 4/1994 Griffin et al. ................. 705/9

5,581,702 A * 12/1996 McArdle et al. ............ 709/204

(Continued)

FOREIGN PATENT DOCUMENTS

| JP | 6-121060 | 4/1994 |
| JP | 7-31701 | 4/1995 |

(Continued)

OTHER PUBLICATIONS

Banddyopadhyay "A Video Conference Network Management System", Dec. 1998 International Journal of Network Management Int J. Network Mgmt.. 8, pp. 182-190.*

(Continued)

*Primary Examiner*—Romain Jeanty
(74) *Attorney, Agent, or Firm*—Staas & Halsey LLP

(57) ABSTRACT

The present invention relates to a conference management assistance apparatus for assisting a presiding person of a conference and has an object to provide information which assists smooth progress of proceedings at a conference. The present invention includes an information accepting section which accepts necessary information needed for scheduling of a given conference, the necessary information containing a scheduled time of the entire conference as well as minimum guaranteed time which needs to be secured at the minimum and desired, normally requested time for each subject to be addressed; and a schedule planning section which plans a schedule for the conference based on the necessary information accepted by the information accepting section.

10 Claims, 14 Drawing Sheets

U.S. PATENT DOCUMENTS

| | | | |
|---|---|---|---|
| 5,781,731 A * | 7/1998 | Koreeda et al. | 709/204 |
| 5,903,637 A * | 5/1999 | Hogan et al. | 379/203.01 |
| 5,907,324 A * | 5/1999 | Larson et al. | 715/753 |
| 5,991,276 A * | 11/1999 | Yamamoto | 370/260 |
| 6,064,976 A * | 5/2000 | Tolopka | 705/9 |
| 6,101,532 A * | 8/2000 | Horibe et al. | 709/206 |
| 6,279,000 B1 * | 8/2001 | Suda et al. | 707/10 |
| 6,381,580 B1 * | 4/2002 | Levinson | 705/8 |
| 6,563,914 B1 * | 5/2003 | Sammon et al. | 379/202.01 |
| 6,687,257 B1 * | 2/2004 | Balasubramanian | 370/429 |
| 6,760,422 B1 * | 7/2004 | Kowal et al. | 379/202.01 |
| 2003/0105818 A1 * | 6/2003 | Lapstun et al. | 709/204 |

FOREIGN PATENT DOCUMENTS

| | | |
|---|---|---|
| JP | 2000-29941 | 1/2000 |
| JP | 969687 A1 * | 5/2000 |
| JP | 2000-193765 | 7/2000 |

OTHER PUBLICATIONS

Choi "A Conference Control Model for Light-weight Sessions; Jul. 1996; Korea Advanced Institute Science Technology"; pp. 1-51.*

Nies et al "Web Conference Scheduling for Research Projects"; Dec. 1999; Western Journal of Nursing Research; pp. 103-107.*

* cited by examiner

| Agenda item | A | B | C | D | Reserve |
|---|---|---|---|---|---|
| Minimum (minutes) | 20 | 20 | 20 | 20 | |
| Normal (minutes) | 60 | 60 | 60 | 60 | |
| Priority | 2 | 1 | 3 | 2 | |
| Internal priority | 2 | 1 | 4 | 3 | |

Fig. 11

| Agenda item | A | B | C | D | Reserve |
|---|---|---|---|---|---|
| Minimum (minutes) | 60 | 60 | 60 | 60 | 60 |

Fig. 12

| Agenda item | A | B | C | D | Reserve |
|---|---|---|---|---|---|
| Minimum (minutes) | 60 | 60 | 20 | 60 | 20 |

Fig. 13

| Agenda item | A | B | C | D | Reserve |
|---|---|---|---|---|---|
| Minimum (minutes) | 20 | 60 | 20 | 20 | 0 |

Fig. 14

| Agenda item | A | B | C | D | Reserve |
|---|---|---|---|---|---|
| Minimum (minutes) | 20 | 20 | 20 | 20 | 20 |

Fig. 15

| Agenda item | A | B | C | D | Reserve |
|---|---|---|---|---|---|
| Minimum | | | 20 | | 30 |
| Normal | 60 | 60 | | 60 | |
| Actual | 50 | 20 | | | |
| Priority | 2 | 1 | 3 | 2 | |
| Skip current Agenda Item | | Close current Agenda Item | | Change Agenda settings | |

Fig. 16

| Agenda item | A | B | C | D | Reserve |
|---|---|---|---|---|---|
| Minimum | | | 20 | | 60 |
| Normal | 60 | 60 | | 60 | |
| Actual | 50 | 30 | | | |
| Priority | 2 | 1 | 3 | 2 | |

| Agenda item | A | B | C | D | Reserve |
|---|---|---|---|---|---|
| Minimum | | | | | 20 |
| Normal | 60 | 60 | 60 | 60 | |
| Actual | 50 | 30 | | | |
| Priority | 2 | 1 | 3 | 2 | |

Change Agenda Settings Apply change

Fig. 17

| Agenda item | A | B | C | D | Reserve |
|---|---|---|---|---|---|
| Minimum | | | 20 | | 30 |
| Normal | 60 | 60 | | 60 | |
| Actual | 50 | 60 | | | |
| Priority | 2 | 1 | 3 | 2 | |

Scheduled time has elapsed.
○ Close Agenda Item
○ Allocate Reseve Time
  ○ All
  ○ Part [ ]minutes
○ Leave Till Last
○ Change Agenda Settings Enter

Fig. 18

| Agenda item | A | B | C | D | Reserve |
|---|---|---|---|---|---|
| Minimum |  |  | 20 |  | 0 |
| Normal | 60 | 90 |  | 60 |  |
| Actual | 50 | 60 |  |  |  |
| Priority | 2 | 1 | 3 | 2 |  |

Fig. 19

| Agenda item | A | C | D | B | Reserve |
|---|---|---|---|---|---|
| Minimum |  | 20 |  |  |  |
| Normal | 60 |  | 60 | 60 |  |
| Actual | 50 |  |  | 60 |  |
| Priority | 2 | 1 | 3 | 2 |  |

Fig. 20

| Agenda item A | B | C | D | Reserve |
|---|---|---|---|---|
| Minimum | | 20 | | 0 |
| Normal | 60 | 90 | | 60 |
| Actual | 50 | 90 | | |
| Priority | 2 | 1 | 3 | 2 |

Scheduled time has elapsed.
○ Close Agenda Item
○ Change Agenda settings
○ Leave Till Last
                      Enter

| Agenda item A | B | C | D | Reserve |
|---|---|---|---|---|
| Minimum | | 20 | 20 | 40 |
| Normal | 60 | 90 | | |
| Actual | 50 | 90 | | |
| Priority | 2 | 1 | 3 | 2 |

1/3                      ↓ ↑ Enter

Fig. 21

| Agenda item A | B | C | D | Reserve |
|---|---|---|---|---|
| Minimum | | 20 | | 0 |
| Normal | 60 | 90 | | 60 |
| Actual | 50 | 90 | | |
| Priority | 2 | 1 | 3 | 2 |

Scheduled time has elapsed.
○ Close Agenda Item
○ Change Agenda settings
○ Leave Till Lost
                      Enter

| Agenda item A | B | C | D | Reserve |
|---|---|---|---|---|
| Minimum | | | | 20 |
| Normal | 60 | 90 | | 60 |
| Actual | 50 | 90 | | |
| Priority | 2 | 1 | | 2 |

2/3                      ↓ ↑ Enter

Fig. 22

CONFERENCE MANAGEMENT ASSISTANCE APPARATUS AND CONFERENCE MANAGEMENT ASSISTANCE PROGRAM

This application is a continuing application, filed under 35 U.S.C. §111(a), of International Application PCT/JP01/05029, filed Jun. 13, 2001.

TECHNICAL FIELD

The present invention relates to a conference management assistance apparatus which provides information in order for a presiding person or chairman of a conference to conduct the conference smoothly as well as to a conference management assistance program which makes a computer operate as the conference management assistance apparatus.

BACKGROUND ART

It is normally left up to a presiding person such as a chairman to direct a conference, and the progress of the conference depends heavily on the skill of the presiding person. As an apparatus which expedites the proceedings of a conference, Japanese Patent Laid-Open No. 6-12060 discloses a system which reports remaining time, breaks, etc. in relation to a remote conferencing system. Also, Japanese Patent Publication 7-31701 discloses a system which draws up a program of a conference taking into consideration the timetables and the like of conference participants.

DISCLOSURE OF THE INVENTION

If the presiding person of a conference is inexperienced, the system which reports remaining time, breaks, etc. as disclosed in Japanese Patent Laid-Open No. 6-12060 may be useful to some extent in making the conference proceed on schedule.

However, at a conference, it is rather rare that each subject proceeds on schedule. Thus, if a subject continues beyond schedule, adjustments are made to finish the entire conference in time by urging the conference to move on to the next subject. The problem is that a system, such as the one disclosed in Japanese Patent Laid-Open No. 6-12060, which reports remaining time, breaks, etc. as scheduled cannot allow for time adjustments in a real conference.

Also, the system disclosed in Japanese Patent Publication 7-31701 is characterized in that it adjusts the program of a conference, but it does not help the conference proceed smoothly once the conference is started.

In view of the above circumstances, the present invention has an object to provide a conference management assistance apparatus which assists smooth progress of proceedings at a conference as well as to provide a conference management assistance program which makes a computer operate as the conference management assistance apparatus.

To achieve the above object, the present invention provides a conference management assistance apparatus which assists progress of proceedings, having:

an information accepting section which accepts necessary information needed for scheduling of a given conference, the necessary information containing a scheduled time of the entire conference as well as minimum guaranteed time which needs to be secured at the minimum and desired, normally requested time for each subject to be addressed; and a schedule planning section which plans a schedule for the conference based on the necessary information accepted by the information accepting section.

Since the conference management assistance apparatus according to the present invention plans a schedule by entering the minimum guaranteed time which needs to be secured at the minimum and normally requested time for each subject as the necessary information needed for scheduling of a conference, it can plan the schedule flexibly according to the progress of proceedings.

In the conference management assistance apparatus according to the present invention, preferably the information accepting section further accepts input of priority of time allocation for each subject to be addressed; and the schedule planning section allocates the normally requested times to the subjects in descending order of priority among the subjects to be addressed at the conference according to the priority accepted by the information accepting section within the scheduled time of the entire conference and allocates the minimum guaranteed times to the remaining subjects to be addressed at the conference other than those to which normally requested times are allocated.

The question as to what subjects should be allocated minimum guaranteed time and what subjects should be allocated normally requested time is flexible as long as there is an enough scheduled time for the entire conference. For example, it is conceivable to allocate the normally requested times to the subjects to be addressed earlier at the conference and then apply the minimum guaranteed times to subsequent subjects when time is running out because the conference proceeds slowly. Alternatively, it is conceivable to allocate the minimum guaranteed times to the subjects to be addressed earlier at the conference, thereby prompting the progress of proceedings, and then apply the normally requested times if there happens to be sufficient time. However, by entering priorities of time allocation and allocating the normally requested time to high priority subjects, and the minimum guaranteed times to low priority subjects according to the entered priorities as described above, it is possible to plan a schedule by reflecting the idea of an operator (presiding person in charge of proceedings).

Also, in the conference management assistance apparatus according to the present invention, preferably the information accepting section further accepts input of the order in which the subjects will be addressed at the conference; and the schedule planning section plans a schedule according to the order at the conference, accepted by the information accepting section.

This allows the idea of the operator (presiding person in charge of proceedings) to be reflected in the order of discussing the subjects addressed at the conference.

Furthermore, preferably the conference management assistance apparatus according to the present invention has a schedule display section which displays the schedule planned by the schedule planning section.

The schedule display section will make it possible to convey new information to the operator (presiding person in charge of proceedings) more quickly if a schedule is changed during a conference than, for example, when printing out a planned schedule.

Furthermore, preferably the conference management assistance apparatus according to the present invention has a schedule management section which measures the time from the start of discussion of the subjects addressed at the conference and gives a notice when a subject under discussion approaches its scheduled discussion end time according to the schedule planned by the schedule planning section.

Since the schedule management section monitors the progress of proceedings in real-time, the operator (presiding person in charge of proceedings) is less distracted by schedule management of the proceedings and can focus on the progress of proceedings accordingly.

Furthermore, in the conference management assistance apparatus according to the present invention, preferably when a subject under discussion reaches its scheduled discussion end time, the information accepting section selects whether to continue discussing the subject under discussion and if the discussion is to be continued, the information accepting section accepts modification of the necessary information which has already been accepted by it; and the schedule planning section replans a subsequent schedule for the conference in progress based on the modification of the necessary information.

In this case, preferably the information accepting section accepts multiple modifications of the necessary information which has already been accepted by it;

the schedule planning section replans multiple schedules corresponding to the multiple modifications of the necessary information; and the information accepting section further allows selection from the multiple replanned schedules.

If the progress of proceedings goes off course, by replanning schedules through modification of the necessary information instead of planning a schedule anew from the beginning, it is possible to shift to a schedule which suits the progress of proceedings while maintaining connection with the original schedule.

In this case, by replanning multiple schedules corresponding to the multiple modifications and selecting one of them, it is possible to continue the conference by shifting to a schedule which suits the situations and atmosphere of the conference at the discretion of the operator (presiding person in charge of proceedings).

To achieve the above object, the present invention also provides a conference management assistance program that runs on a computer and makes the computer operate as a conference management assistance apparatus which assists progress of proceedings and has:

an information accepting section which accepts necessary information needed for scheduling of a given conference, the necessary information containing a scheduled time of the entire conference as well as minimum guaranteed time which needs to be secured at the minimum and desired, normally requested time for each subject to be addressed; and a schedule planning section which plans a schedule for the conference based on the necessary information accepted by the information accepting section.

In the conference management assistance program according to the present invention, preferably the information accepting section accepts input of priority of time allocation for each subject to be addressed; and the schedule planning section allocates the normally requested times to the subjects in descending order of priority among the subjects to be addressed at the conference according to the priority accepted by the information accepting section within the scheduled time of the entire conference and allocates the minimum guaranteed times to the remaining subjects to be addressed at the conference other than those to which normally requested times are allocated.

Also, in the conference management assistance program according to the present invention, preferably the information accepting section further accepts input of the order in which the subjects will be addressed at the conference; and the schedule planning section plans a schedule according to the order at the conference, accepted by the information accepting section.

Furthermore, preferably the conference management assistance program according to the present invention makes the computer operate as a conference management assistance apparatus equipped with a schedule display section which displays the schedule planned by the schedule planning section. Also, it is preferable to make the computer operate as a conference management assistance apparatus equipped with a schedule management section which measures the time from the start of discussion of the subjects addressed at the conference and gives a notice when a subject under discussion approaches its scheduled discussion end time according to the schedule planned by the schedule planning section.

Furthermore, in the conference management assistance program according to the present invention, preferably when a subject under discussion reaches its scheduled discussion end time, the information accepting section selects whether to continue discussing the subject under discussion and if the discussion is to be continued, the information accepting section accepts modification of the necessary information which has already been accepted by it; and the schedule planning section replans a subsequent schedule for the conference in progress based on the modification of the necessary information.

In this case, preferably the information accepting section accepts multiple modifications of the necessary information which has already been accepted by it; the schedule planning section replans multiple schedules corresponding to the multiple modifications of the necessary information; and the information accepting section further allows selection from the multiple replanned schedules.

BRIEF DESCRIPTION OF THE DRAWINGS

FIG. 11 is a diagram showing an example of necessary information.

FIG. 12 is a diagram showing times assigned to agenda items A, B, C, and D when a scheduled time of 300 minutes is specified for an entire conference.

FIG. 13 is a diagram showing times assigned to agenda items A, B, C, and D when a scheduled time of 220 minutes is specified for an entire conference.

FIG. 14 is a diagram showing times assigned to agenda items A, B, C, and D when a scheduled time of 120 minutes is specified for an entire conference.

FIG. 15 is a diagram showing times assigned to agenda items A, B, C, and D when a scheduled time of 100 minutes is specified for an entire conference.

FIG. 16 is a diagram showing an exemplary screen during proceedings.

FIG. 17 is a diagram showing an exemplary screen brought up when an agenda item is closed earlier.

FIG. 18 is a diagram showing an exemplary screen brought up if an agenda item is not closed even if a scheduled end time arrives.

FIG. 19 is a diagram showing an exemplary screen brought up if "Allocate Reserve Time" and "All" are selected in FIG. 18.

FIG. 20 is a diagram showing an exemplary screen brought up if "Leave Till Last" is selected in FIG. 18.

FIG. 21 is a diagram showing an exemplary screen brought up if the reserve time of 30 minutes shown in FIG. 19 is given to agenda item B to continue deliberation of agenda item B for 90 minutes, but the deliberation of agenda item B does not end even after all the 90 minutes including the reserve time of 30 minutes is used up.

FIG. 22 is a diagram showing another exemplary screen similar to the one shown in FIG. 21.

BEST MODE FOR CARRYING OUT THE INVENTION

Embodiments of the present invention will be described below. Here, as an example of a conference management assistance apparatus of the present invention, description will be given of a notebook personal computer (hereinafter referred to as a "notebook PC") as well as application programs running on the notebook PC.

Figure 1:
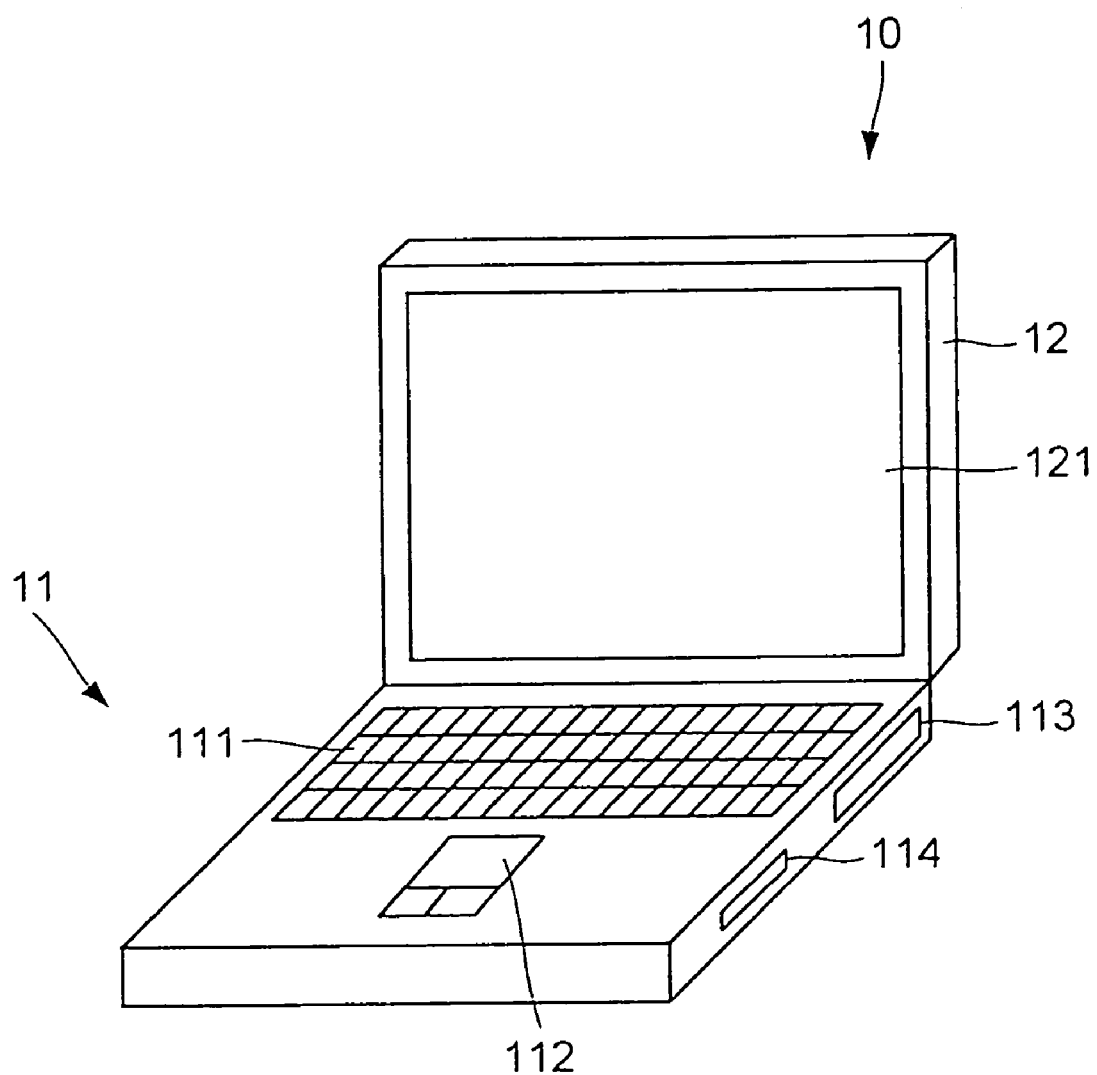
FIG. 1 is an external perspective view of a notebook PC which operates as an embodiment of a conference management assistance apparatus according to the present invention.

FIG. 1 is an external perspective view of the notebook PC which operates as an embodiment of the conference management assistance apparatus according to the present invention.

The notebook PC 10 has a main unit 11 and display panel 12. The display panel 12 is hinged (not shown) to the main unit 11 and can be opened and closed freely.

The main unit 11 contains a CPU, magnetic disk, etc., above which a keyboard 111, trackpad 112, etc. are mounted. On a flank, the main unit 11 is equipped with a CD-ROM port 113 in which a CD-ROM is mounted and an FD port 114 in which a flexible disk (FD) is mounted.

The display panel 12 has a liquid-crystal display screen 121 mounted on its front when it is open as shown in FIG. 1.

Figure 2:
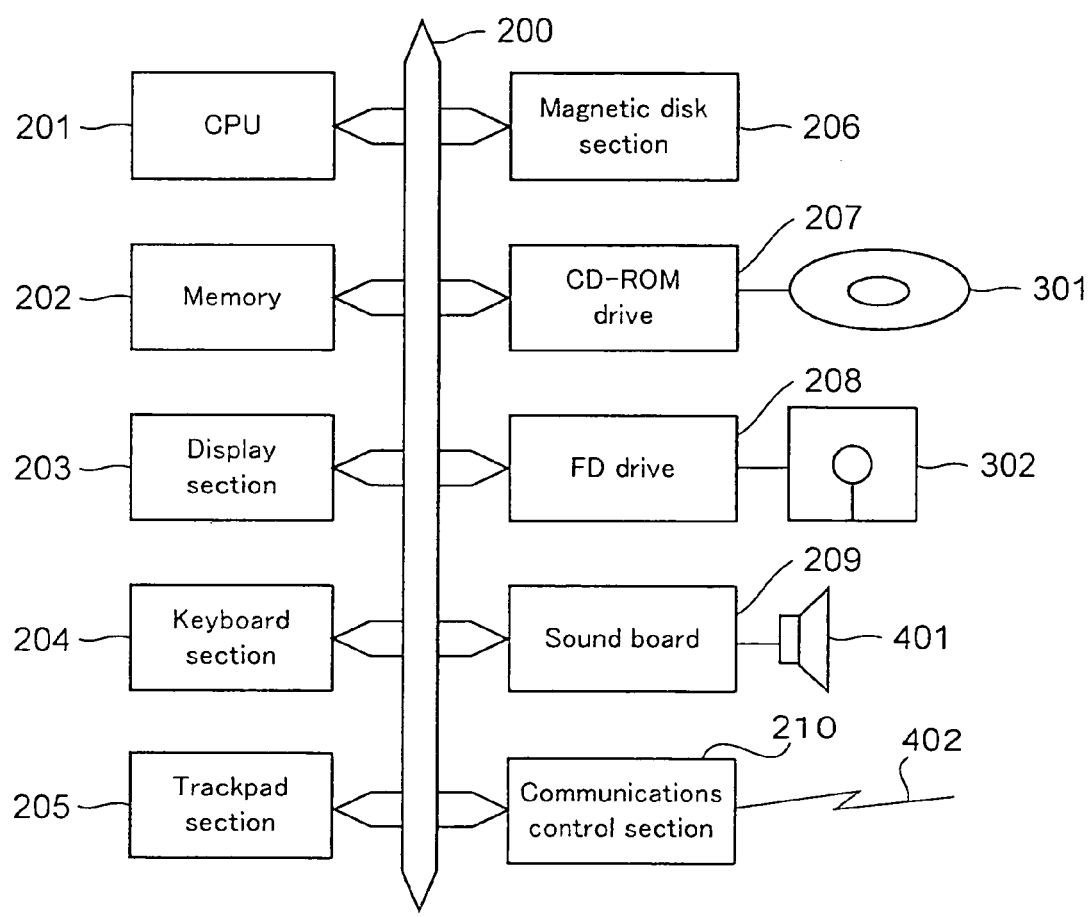
FIG. 2 is an internal block diagram of the notebook PC whose outward appearance is shown in FIG. 1.

FIG. 2 is an internal block diagram of the notebook PC whose outward appearance is shown in FIG. 1.

As shown here, the notebook PC has a CPU 201, memory 202, display section 203, keyboard section 204, trackpad section 205, magnetic disk section 206, CD-ROM drive 207, FD drive 208, sound board 209, and communications control section 210, which are interconnected via a bus 200.

The magnetic disk section 206 is composed of a magnetic disk, magnetic disk drive which drives the magnetic disk, etc. Various programs have been installed on the magnetic disk and the magnetic disk section 206 serves to read these programs as well as to write and store new programs or data on the magnetic disk.

Programs read from the magnetic disk section 206 are loaded into the memory 202 and executed by the CPU 201.

The display section 203 is equipped with the liquid-crystal display screen 121 on the display panel 12 shown in FIG. 1 and serves to display various images on the liquid-crystal display screen 121.

The keyboard section 204 is equipped with the keyboard 111 shown in FIG. 1 and transmits keyboard operations performed by the operator of the notebook PC to the CPU 201.

The trackpad section 205 is equipped with the trackpad 112 shown in FIG. 1 and transmits trackpad 112 operations performed by the operator to the CPU 201.

The CD-ROM drive 207 accesses a CD-ROM 301 inserted via the CD-ROM port 113 shown in FIG. 1 and uploads programs, data, etc. from the CD-ROM to the notebook PC 10.

The FD drive 208 accesses a flexible disk (FD) 302 inserted in the FD port 114 shown in FIG. 1. It loads data, etc. stored on the FD 302 on the notebook PC 10 or writes data etc. from the notebook PC into the FD 302. It is possible to upload programs to the notebook PC 10 from the FD 302 rather than from the CD-ROM 301 described above.

The sound board 209 outputs voice, beeps, etc. through a speaker 401 under instructions from a program running on the CPU 201.

The communications control section 210 takes charge of external communications. It is connected to the Internet or the like via a communications line 402.

The programs to which the present invention is applied may be either recorded on a portable recording medium such as the above described CD-ROM or FD and uploaded from it to the notebook PC 10 or recorded in advance on the magnetic disk in the notebook PC 10. Alternatively, the programs to which the present invention is applied may be stored in another device and captured from it via the communications line 402.

Figure 3:
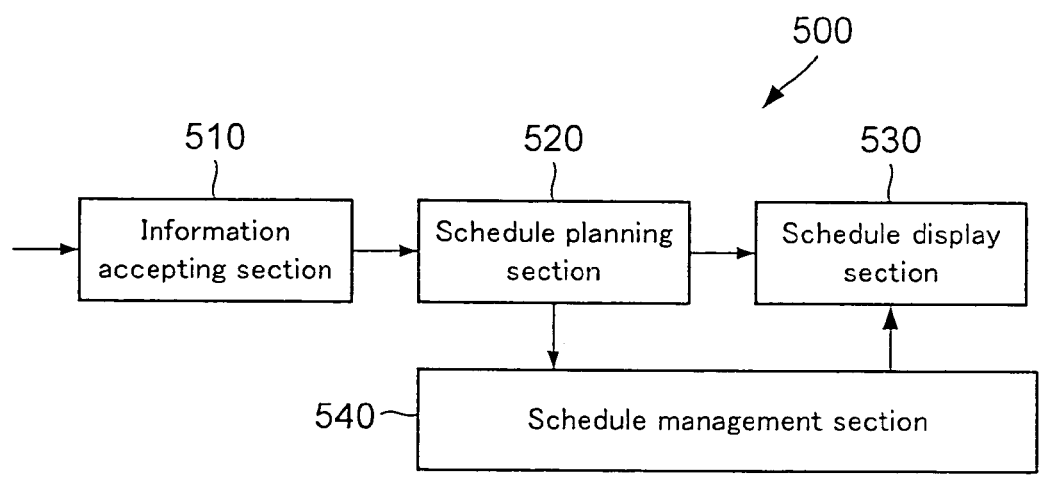
FIG. 3 is a functional block diagram of a conference management assistance apparatus as an embodiment of the present invention.

FIG. 3 is a functional block diagram of the conference management assistance apparatus which is an embodiment of the present invention and is composed of the notebook PC 10 shown in FIGS. 1 and 2 and programs running on the notebook PC 10.

The conference management assistance apparatus 500 shown in FIG. 3 is composed of an information accepting section 510, schedule planning section 520, schedule display section 530, and schedule management section 540.

The information accepting section 510 accepts necessary information needed for scheduling of a given conference, the necessary information containing a scheduled time of the entire conference as well as minimum guaranteed time which needs to be secured at the minimum and desired, normally requested time for each subject to be addressed of the conference. In terms of hardware, it corresponds to a combination of the keyboard 111, trackpad 112, the CPU 201 which runs programs, etc.

The schedule planning section 520 plans a schedule for the conference based on the necessary information accepted by the information accepting section 510. In terms of hardware, it corresponds to the CPU 201 which runs programs for schedule planning.

Also, the information accepting section 510 further accepts input of priority of time allocation for each subject to be addressed; and the schedule planning section 520 allocates the normally requested times to the subjects in descending order of priority among the subjects to be addressed at the conference according to the priority accepted by the information accepting section 510 within the scheduled time of the entire conference and allocates the minimum guaranteed times to the remaining subjects to be addressed at the conference other than those to which normally requested times are allocated.

Furthermore, the information accepting section 510 further accepts input of the order in which the subjects will be addressed at the conference; and the schedule planning section 520 plans a schedule according to the order at the conference, accepted by the information accepting section 510.

Also, the schedule display section 530 displays the schedule planned by the schedule planning section 520.

In terms of hardware, the schedule display section 530 corresponds to a combination of the liquid-crystal display screen 121 shown in FIG. 1, the CPU 201 which runs a program for creating screens brought up on the liquid-crystal display screen 121, and so on.

Also, the schedule management section 540 measures the time from the start of discussion of the subjects addressed at the conference and gives a notice when a subject under discussion approaches its scheduled discussion end time according to the schedule planned by the schedule planning section 520. In this case, the notice is provided as an alarm sound produced by the speaker 401 shown in FIG. 2 and a message in a schedule presented on the schedule display section 530. In terms of hardware, the schedule management section 540 corresponds to a combination of the CPU 201 running a program for it, the speaker 401 which produces the alarm sound, and so on.

Also, when a subject under discussion reaches its scheduled discussion end time, the information accepting section 510 accepts selection as to whether to continue discussing the subject under discussion and if the discussion is to be continued, the information accepting section 510 accepts modification of the necessary information which has already been accepted by it; and the schedule planning section 520 replans a subsequent schedule for the conference in progress based on the modification of the necessary information.

In this case, the information accepting section 510 accepts multiple modifications of the necessary information which has already been accepted by it; the schedule planning section 520 replans multiple schedules corresponding to the multiple modifications of the necessary information; and the information accepting section 510 further allows selection from the multiple replanned schedules.

Figure 4:
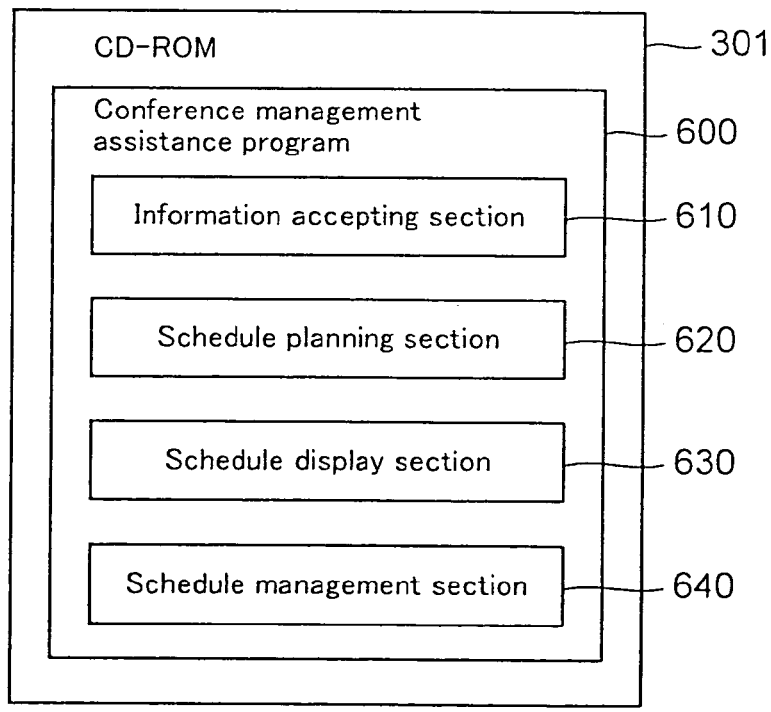
FIG. 4 is a schematic diagram showing an embodiment of a conference management assistance program according to the present invention.

FIG. 4 is a schematic diagram showing an embodiment of a conference management assistance program according to the present invention.

The conference management assistance program 600 is stored on the CD-ROM 301. The CD-ROM 301 is mounted on the notebook PC 10 through the CD-ROM port 113 (see FIG. 1) and accessed by the CD-ROM drive 207 (see FIG. 2), and thereby the conference management assistance program 600 stored on the CD-ROM 301 is installed on the notebook PC 10. As the installed conference management assistance program 600 is run on the notebook PC, the conference management assistance apparatus 500 shown in FIG. 3 is implemented.

The conference management assistance program 600 shown in FIG. 4 is composed of an information accepting section 610, schedule planning section 620, schedule display section 630, and schedule management section 640.

The program components 610 to 640 composing the conference management assistance program 600 correspond to the components 510 to 540 of the conference management assistance apparatus 500 shown in FIG. 3 carrying the same name as the respective components 610 to 640. However, whereas the components 510 to 540 composing the conference management assistance apparatus shown in FIG. 3 are constituted of combinations of hardware and software, the program components 610 to 640 composing the conference management assistance program 600 in FIG. 4 are constituted only of application programs. When installed and run on the notebook PC shown in FIGS. 1 and 2, the program components 610 to 640 operate in the same manner as the corresponding components 510 to 540 of the conference management assistance apparatus shown in FIG. 3, and thus, redundant description will be omitted.

More concrete embodiments will be described below.

Figure 5:
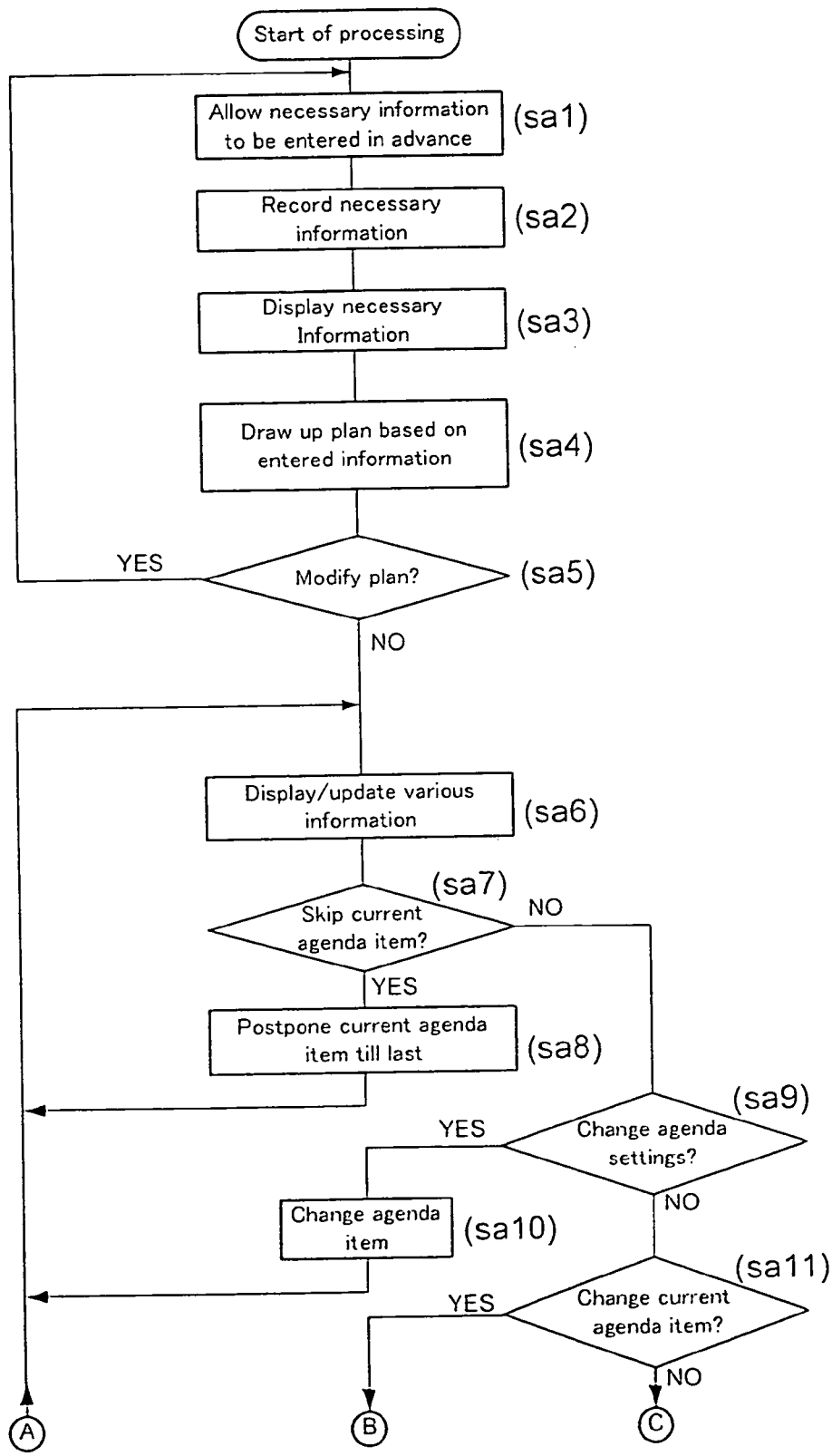
FIG. 5 is a flowchart of a main program of the conference management assistance program.
Figure 6:
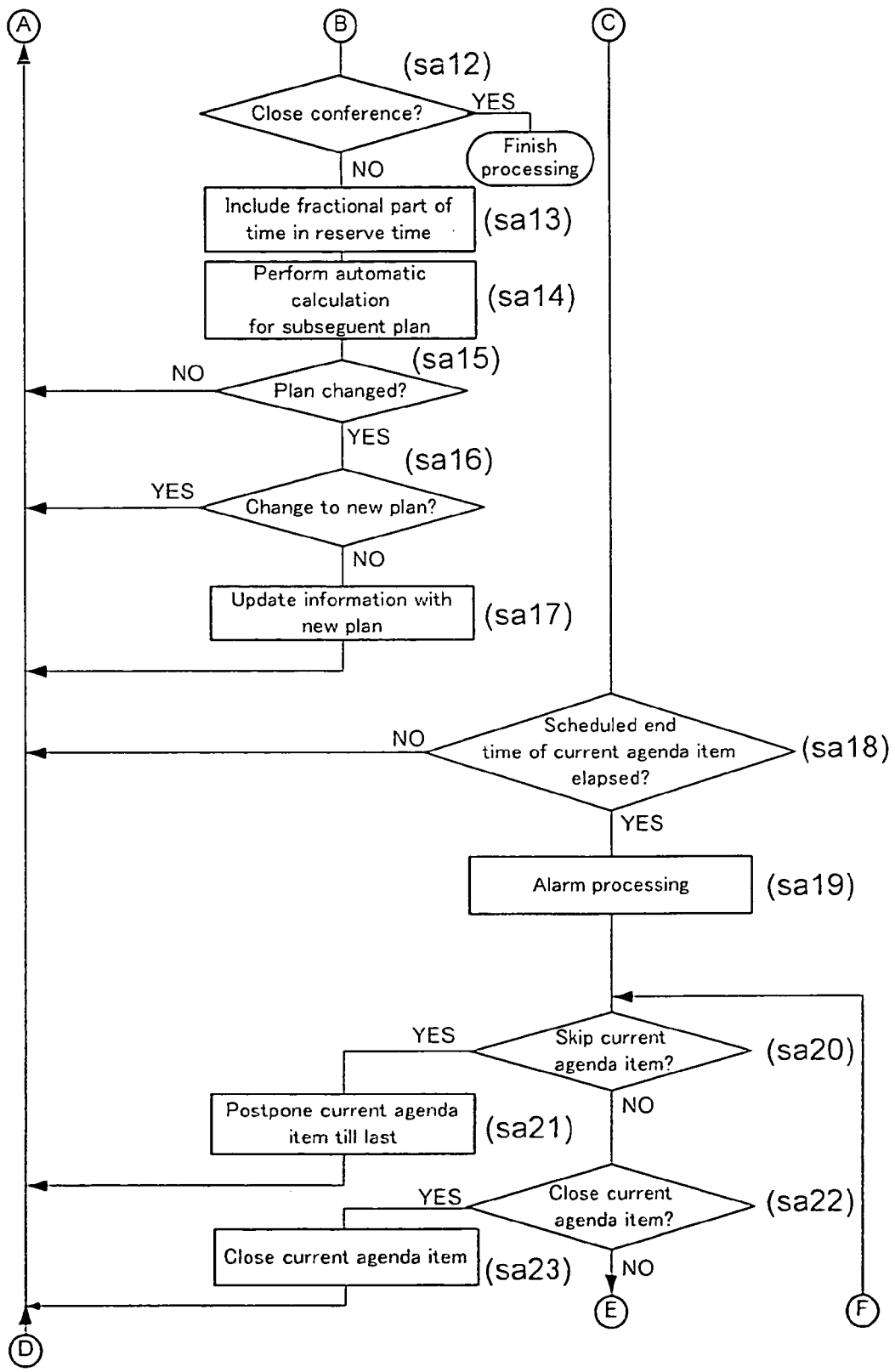
FIG. 6 is a flowchart of the main program of the conference management assistance program.
Figure 7:
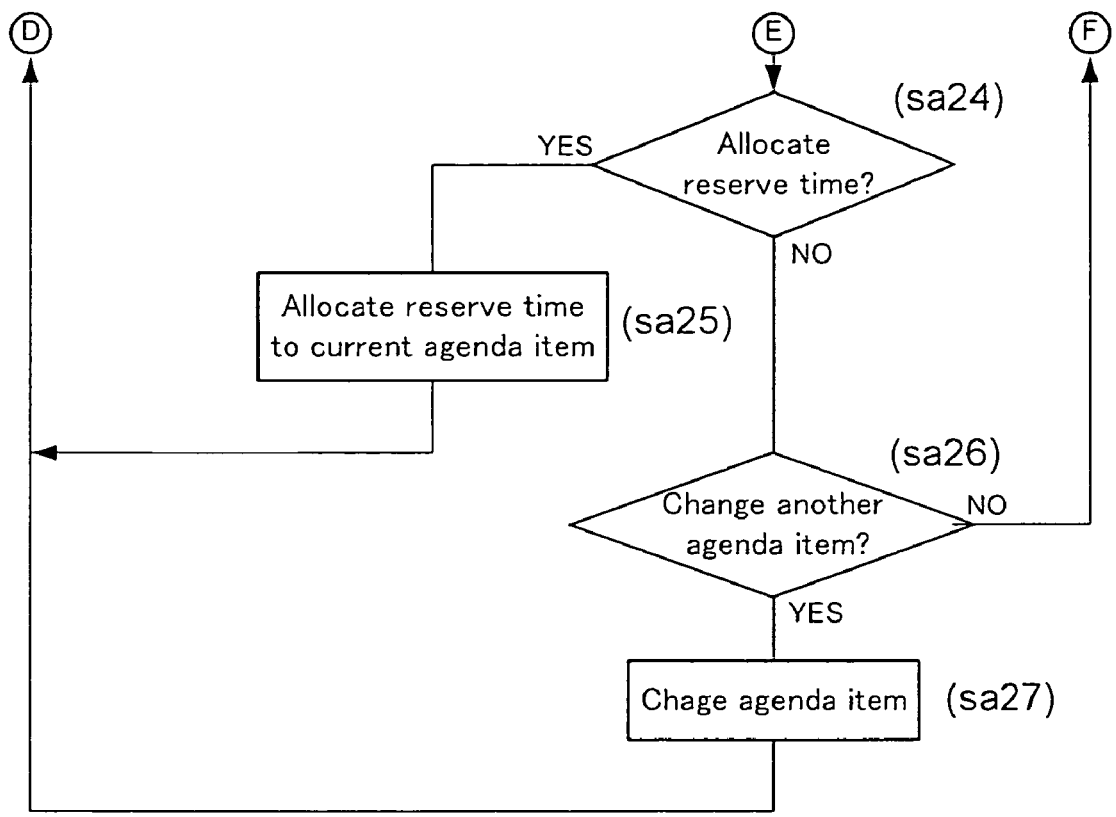
FIG. 7 is a flowchart of the main program of the conference management assistance program.

FIGS. 5 to 7 show a flowchart of a main program of the conference management assistance program run on the notebook PC 10 shown in FIGS. 1 and 2.

Prior to the opening of a conference, necessary information needed for scheduling of the conference is entered (step sa1). The keyboard 111 or trackpad 112 shown in FIG. 1 is used to enter the information. Information entered as the necessary information includes the scheduled time of the entire conference, subjects, the priority of time allocation for each subject, the order in which the subjects will be addressed at the conference, the minimum guaranteed time which needs to be secured for each subject at the minimum, and the time desired to be requested for the discussion of each subject (normally requested time) if available.

The entered necessary information is recorded in an area which can be referred to by the program (step sa2) and displayed on the liquid-crystal display screen 121 in FIG. 1 for confirmation by the operator (step sa3).

In this case, entry, recording, and display of the necessary information in steps sa1 to sa3 correspond to the basic part of the information accepting section 610 shown in FIG. 4.

When the necessary information has been entered, the main program shown in FIG. 5, draws up a plan (schedule) for the conference based on the entered information and displays the planned schedule on the liquid-crystal display screen 121 shown in FIG. 1 to allow the operator to check the schedule (presiding person in charge of proceedings) (step sa4). Step sa4 corresponds to the basic part of the schedule planning section 620 shown in FIG. 4.

To change the schedule (step sa5), the operator should return to step sa1 and re-enter the necessary information.

Figure 8:
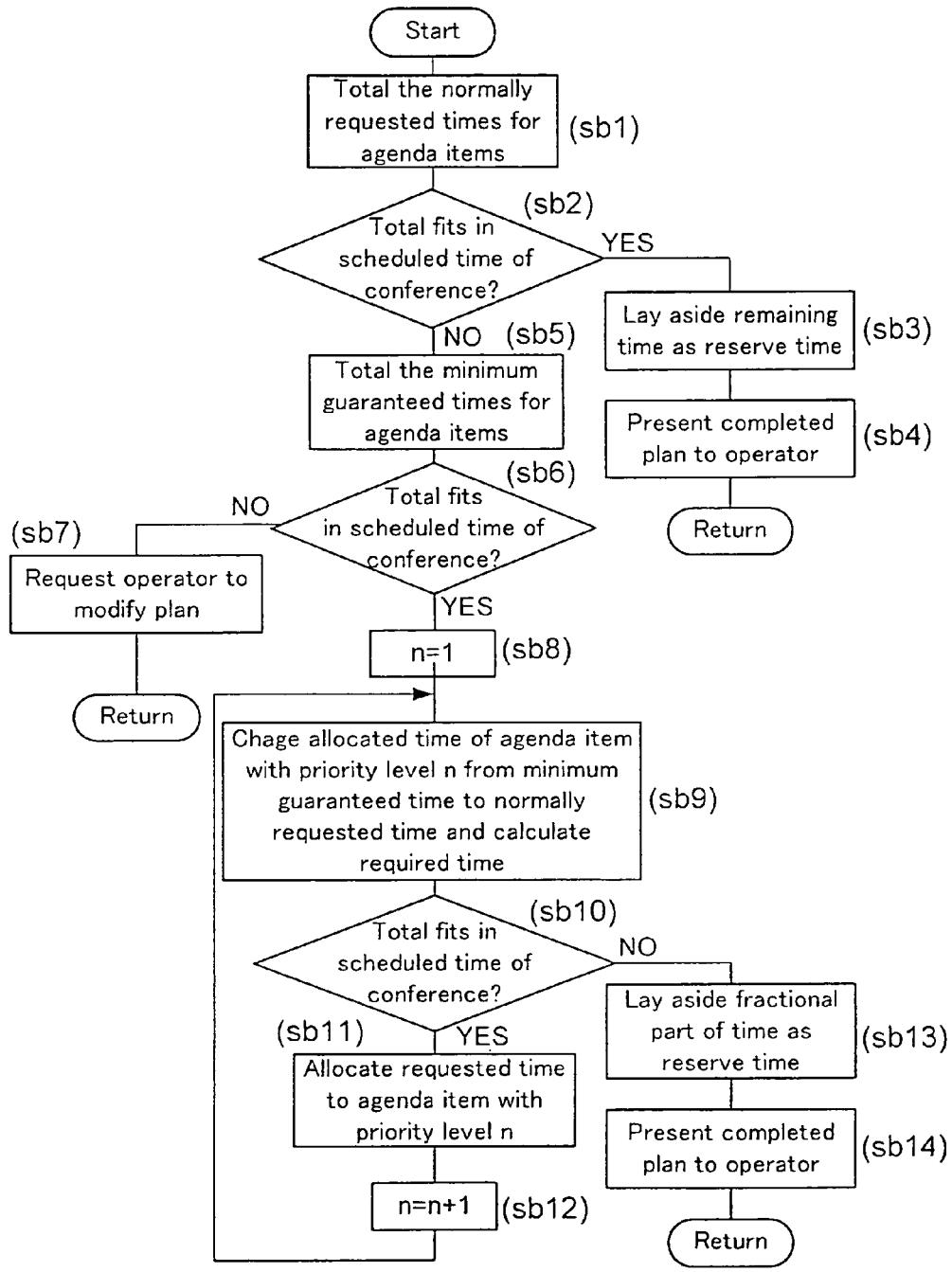
FIG. 8 is a flowchart showing a schedule planning routine.

FIG. 8 is a flowchart showing a schedule planning routine for step sa4 in FIG. 5.

Here, the normally requested times for the agenda items of the entire conference are totaled (step sb1) and it is judged whether the total time fits in the scheduled time of the entire conference (step sb2). If the total value of the normally requested times for the agenda items fits in the scheduled time of the entire conference, the normally requested times determined individually for all the agenda items are allocated to the respective agenda items and the remaining time is laid aside as a reserve time (step sb3). Also, the completed plan (schedule) is presented to the operator (step sb4).

On the other hand, if the total value of the normally requested times for the agenda items does not fit in the scheduled time of the entire conference (step sb2), the total value of the minimum guaranteed times for the agenda items composing the entire conference is calculated (step sb5) and it is judged whether the total value of the minimum guaranteed times fits in the scheduled time of the entire conference (step sb6).

If the total value of the minimum guaranteed times does not fit in the scheduled time of the entire conference, the operator is requested to modify the plan (to extend the scheduled time of the conference or delete some subjects from the agenda).

If the total value of the normally requested times for the agenda items does not fit in the scheduled time of the entire conference (step sb2), but the total value of the minimum guaranteed times fits in the scheduled time of the entire conference (step sb6), the normally requested times are allocated to high priority agenda items and the minimum guaranteed times are allocated to low priority agenda items as far as they fit in the scheduled time of the entire conference (steps sb8 to sb12). Any fractional part of time is laid aside as a reserve time (step sb13). The plan drawn up in this way is presented to the operator (step sb14).

Returning to FIG. 5, description of the main routine will be continued.

When the notebook PC 10 is notified that the schedule planned in step sa4 is approved (step sa5), various information about the progress of proceedings is displayed, including the elapsed time of the subject currently under discussion, preset end time of the subject, and so on (step sa6). The display process in step sa6 corresponds to the schedule display section 630 in FIG. 4.

Even during a conference, its plan (schedule) can be modified. Specifically, in step sa7, the operator enters an instruction as to whether to move to the next subject by interrupting (skipping) the agenda item currently under discussion.

The instruction input in step sa7 is also accepted by the information accepting section 610 in FIG. 4. If an instruction to skip the agenda item currently under discussion is given in step sa7, the schedule is changed so as to discuss the agenda item currently under discussion at the end (step sa8) and the changed schedule is displayed and changed every moment (step sa6).

If an instruction to change agenda settings is given (step sa9), an agenda change process is carried out (step sa10).

Figure 9:
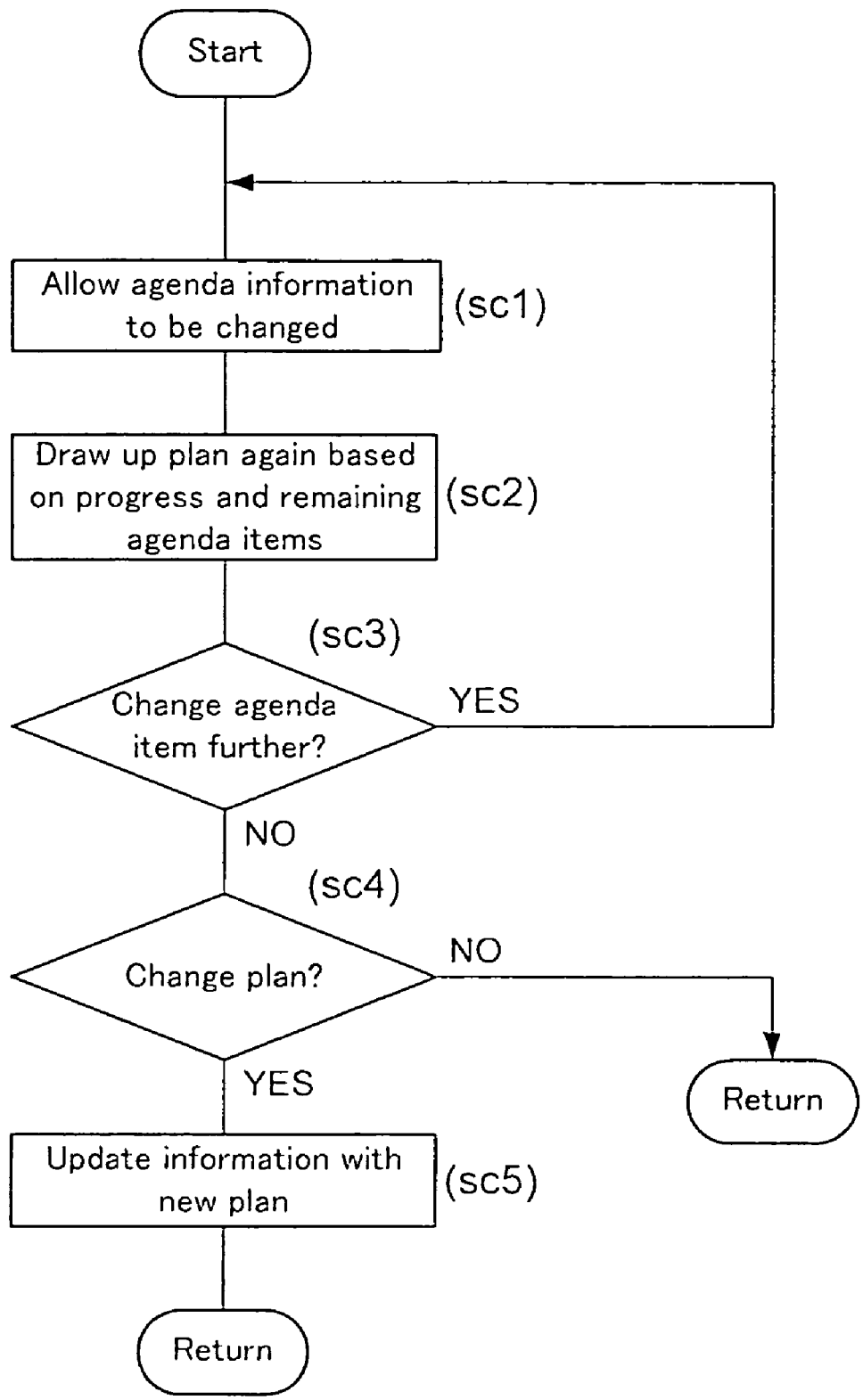
FIG. 9 is a flowchart showing a routine for an agenda change process.

FIG. 9 is a flowchart showing a routine for the agenda change process in step sa10.

Here, the operator changes agenda information: for example, changes the normally requested times or minimum guaranteed times of remaining agenda items, modifies the scheduled time of the entire conference, or cancels off some agenda items (step sc1). Based on the changed agenda information as well as on the current progress and remaining agenda items, the plan (schedule) is drawn up again (step sc2). The schedule planning routine shown in FIG. 9 is used for the replanning.

The agenda information can be changed in several ways (step sc3). In that case, a plan (schedule) is drawn up again for each change.

The plan drawn up again based on the changed agenda information is presented to the operator. If the operator looking at the indicated plan accepts the presented plan (one of plans if two or more plans are drawn up again) (step sc4), the old plan is replaced by the new plan (step sc5). If the presented plan is not accepted, the processing returns to the main routine without any change of plan.

Returning to FIG. 5 again, description of the main routine will be continued.

If the operator gives an instruction to close the current agenda item (step sa11), the processing goes to step sa12 in FIG. 6, where it is judged whether the closure of the current agenda item concludes the conference itself, i.e., whether all the agenda items scheduled for the conference have been addressed. If the conference itself is over, the processing is finished.

If the closure of the current agenda item does not conclude the conference itself and there are some agenda items yet to be addressed, the processing goes to step sa13, where the fractional part of time is included in the reserve time, and then automatic calculation is performed for the subsequent plan (schedule) (step sa14).

Figure 10:
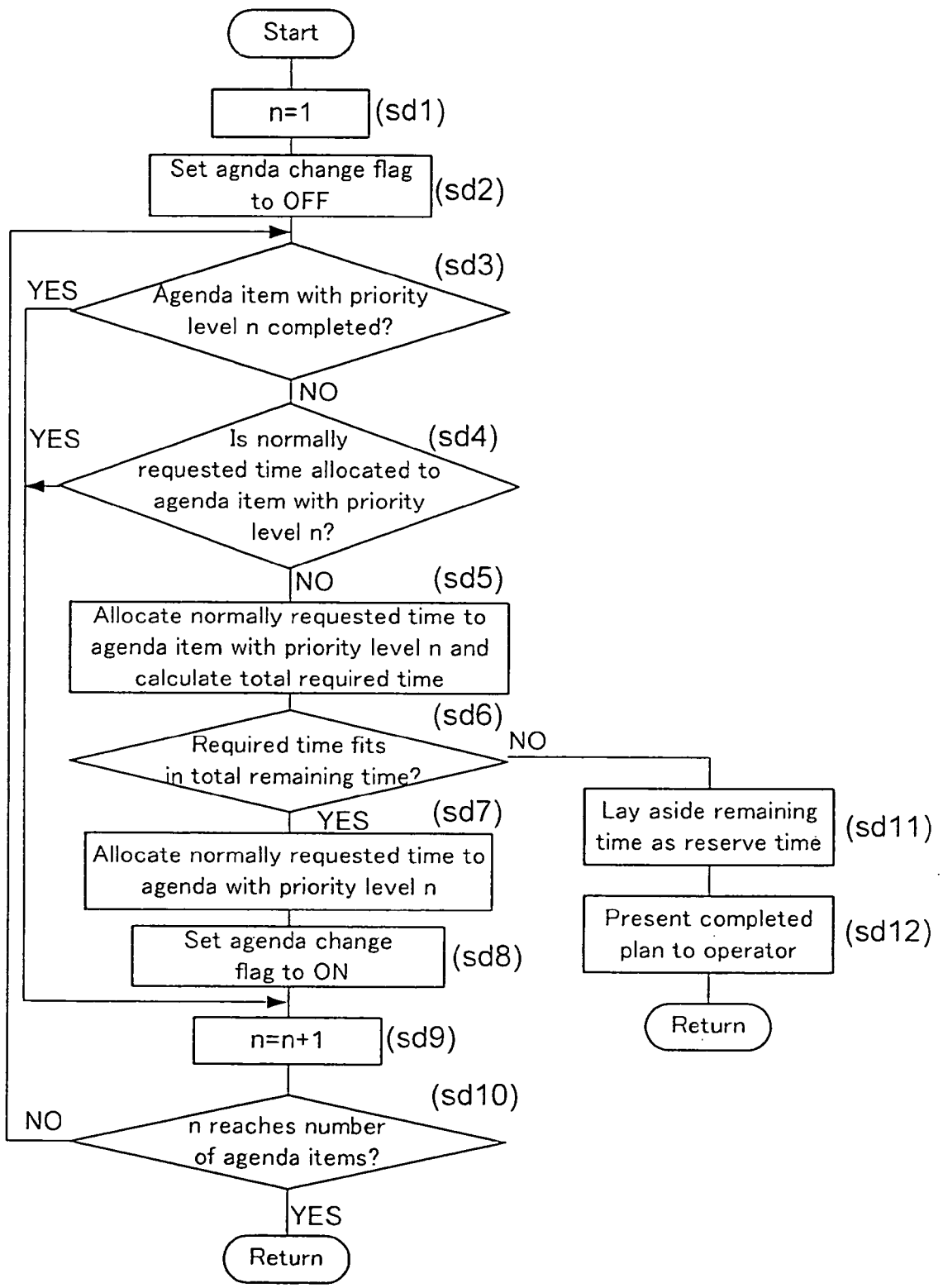
FIG. 10 is a flowchart of an automatic calculation routine for plans.

FIG. 10 is a flowchart showing a routine for the automatic calculation for plans in step sa14.

First in preparation, n is set to 1 and an agenda change flag is set to OFF (steps sd1 and sd2), and it is judged whether deliberation of an agenda item with priority level n has been completed, beginning with the top priority agenda item (with the smallest value of priority level n) (step sd3). If it has not been completed yet, it is judged whether the normally requested time has been allocated to the agenda item (step sd4). In this way, agenda items are checked beginning with the top priority agenda item. If an uncompleted agenda item to which the minimum guaranteed time is allocated is detected, the total value of the times needed for all the remaining agenda items is calculated (step sd5) assuming that the normally requested time is allocated to the detected agenda item. Then, it is determined whether the total value thus calculated fits in the total remaining time of the conference (step sd6).

If the total value fits in the total remaining time of the conference, the normally requested time is allocated to the given agenda item with priority level n (step sd7). The agenda change flag is set to ON (step sd8) and n is incremented (step sd9).

The processes of steps sd3 to sd9 above are performed beginning with the top priority agenda item and when the total value of the needed times calculated in step sd5 no longer fits in the total remaining time of the conference (step sd6), the remaining time is laid aside as a reserve time (step sd11) and the completed plan is presented to the operator (step sd12).

Returning to the main routine (FIG. 6 in this case) again, description will be continued.

In step sa15, it is judged whether there was a change of plan in step sa14. This judgment is made by checking whether the agenda change flag is set to OFF or ON in FIG. 10.

If there was no change, the processing returns to step sa6 in FIG. 5. If there was a change, the operator is asked whether to change the current plan to the one for which the automatic calculation was carried out in step sa14 (step sa16). If the operator indicates an intention not to change to the plan for which the automatic calculation was carried out, the processing returns to step sa6 in FIG. 5 as is the case when there is no change of plan as a result of the automatic calculation (step sa15).

If the plan is changed (step sa15) as a result of automatic calculation in step sa14 and the operator approves the new plan (step sa16), the liquid-crystal display screen 121 (see FIG. 1) is updated to display information about the new plan. If the operator does not approve the new plan, intending to make further changes to the plan (calculation results), the processing goes to steps sa6, sa7, sa9, and sa10 in this order after step sa16. In step sa10, the agenda is changed in the manner described above.

When the scheduled end time of the agenda item currently being deliberated elapses (step sa18), alarm processing is performed (step sa19).

The alarm processing here includes displaying information on the liquid-crystal display screen 121 in FIG. 1 and producing an alarm sound through the speaker 141 in FIG. 2. The routine which goes through steps sa8 to sa19 to monitor the scheduled end time of an agenda item and perform the alarm processing when the scheduled end time elapses corresponds to the schedule management section 640 in FIG. 4.

After the alarm processing, the main routine enters a wait state to wait for an instruction from the operator. The displayed information is updated with the passage of time.

If the operator gives an instruction to skip the current agenda item (step sa20), the current agenda item is postponed till last (step sa21). If the operator gives an instruction to close the current agenda item (step sa22), the current agenda item is closed (step sa23). If the operator gives an instruction to allocate the reserved time to the current agenda item (step sa24 in FIG. 7), the reserved time is allocated to the current agenda item (step sa25). If the operator gives an instruction to change an agenda item other than the current agenda item, a change is made according to the instruction—for example, the normally requested time allocated to the specified agenda item is changed to the minimum guaranteed time or the specified agenda item is deleted from the subjects of the conference—and the time gained by the change is allocated to the current agenda item.

The main routine enters a wait state until any of the instructions in steps sa20, sa22, sa24, and sa26 is given by the operator.

Next, exemplary screens according to the present embodiment will be described.

FIG. 11 is a diagram showing an example of the necessary information entered at step sa1 in FIG. 4. However, the total time of the conference is omitted here from the necessary information. It will be described with reference to FIG. 12 and later.

It has been specified here that four agenda items A, B, C, and D should be deliberated in this order, that a minimum guaranteed time of 20 minutes and normally requested time of 60 minutes should be specified for each agenda item, and that priorities of 2, 1, 3, and 2 should be assigned to the agenda items A, B, C, and D, respectively.

Here, the same priority may be assigned to two or more agenda items, but in that case, the agenda item addressed earlier is internally treated more preferentially to avoid the use of the same priority. Thus, the internal priority levels of the agenda items A, B, C, and D are 2, 1, 4, and 3, respectively.

FIG. 12 is a diagram showing times assigned to agenda items A, B, C, and D when a scheduled time of 300 minutes is specified for an entire conference.

Here, a normally requested time of 60 minutes is specified for each of the agenda items A, B, C, and D. Since a sufficient time of 300 minutes has been secured as a definite time, 60 minutes is allocated to each agenda item and still the remaining 60 minutes is laid aside as a reserve time.

FIG. 13 is a diagram showing times assigned to agenda items A, B, C, and D when a scheduled time of 220 minutes is specified for an entire conference.

Here, the scheduled time of the entire conference is 220 minutes and the normally requested time of 60 minutes cannot be allocated to all the agenda items A, B, C, and D. Thus, the normally requested time (60 minutes) is allocated to the three high priority agenda items A, B, and D, the minimum guaranteed time (20 minutes) is assigned to the lowest priority agenda item C, and the remaining 20 minutes is laid aside as a reserve time.

FIG. 14 is a diagram showing times assigned to agenda items A, B, C, and D when a scheduled time of 120 minutes is specified for an entire conference.

In this case, only the top priority agenda item B is allocated the normally requested time (60 minutes) and the other agenda items A, C, and D are allocated the minimum guaranteed time (20 minutes). There is no time left, meaning that the reserve time is zero.

FIG. 15 is a diagram showing times assigned to agenda items A, B, C, and D when a scheduled time of 100 minutes is specified for an entire conference.

In this case, the minimum guaranteed time is allocated to all the agenda items A, B, C, and D and 20 minutes is laid aside as a reserve time.

Although not shown, if less than 80 minutes is specified as the scheduled time of the entire conference under the conditions of FIG. 11, an error will result and the operator will be prompted to re-enter the necessary information.

FIG. 16 is a diagram showing an exemplary screen displayed during proceedings.

The figure shows a plan (schedule) which results when the necessary information shown in FIG. 11 is entered and a scheduled time of 220 minutes is specified for an entire conference. Agenda item A to which the normally requested time of 60 minutes is allocated is closed in 50 minutes and then the conference moves on to agenda item B. The figure shows a state 20 minutes after agenda item B is opened. Since agenda item A to which the normally requested time of 60 minutes has been allocated is closed in 50 minutes, the difference of 10 minutes is added to the reserve time, which consequently is 30 minutes now.

There are "Skip Current Agenda Item," "Close Current Agenda Item," and "Change Agenda Settings" buttons displayed at the bottom of the screen. When these buttons are pressed, the processes of step sa7, step sa11, and step sa9 in FIG. 5 are carried out, respectively. Clicking the "Change Agenda Settings" button brings up a screen similar to the one shown in FIG. 21 or 22 (except for the message "Scheduled time has elapsed"), allowing the operator to perform processes similar to those described later with reference to FIG. 21 or 22.

FIG. 17 is a diagram showing an exemplary screen brought up when an agenda item is closed earlier.

FIG. 17 shows a state which results when agenda item B is closed in 30 minutes. The upper part of FIG. 17 shows a screen (see step sa13 in FIG. 6) displayed when the "Close Current Agenda Item" button is clicked and the lower part of FIG. 17 shows a screen (see step sa14 in FIG. 6) which presents a plan resulting from recalculation after the current agenda item is closed.

As can be seen from the screen in the lower part, the normally requested time of 60 minutes is allocated to agenda item C and the reserve time is reduced to 20 minutes accordingly.

Two buttons are displayed at the bottom of FIG. 17: "Change Agenda Settings" and "Apply Change." Clicking the "Apply Change" button allows the plan in the lower part (step sa17 in FIG. 6) to take effect.

The "Change Agenda Settings" button in FIG. 17 is clicked when the plan in the lower part of FIG. 17 is unsatisfactory. If the "Change Agenda Settings" button is pressed, the plan in the lower part of FIG. 17 is not approved and the operator is allowed to make agenda settings anew (the flow returns from step sa16 in FIG. 6 to step sa6 in FIG. 5 and then goes through steps sa7 and sa9 to step sa10).

FIG. 18 is a diagram showing an exemplary screen brought up if an agenda item is not closed even if a scheduled end time arrives.

FIG. 16 above shows an exemplary screen displayed when agenda item A is closed in 50 minutes, the conference moves on to agenda item B, and 20 minutes elapses subsequently. Then, if agenda item B continues to be deliberated and the 60 minutes allocated to agenda item B elapses, the screen shown in FIG. 18 is brought up and an alarm is sounded through the speaker.

An alarm message "Scheduled time has elapsed" is shown in FIG. 18. Besides, options are offered: "Close Agenda Item," "Allocate Reserve Time," "Leave Till Last," and "Change Agenda Settings." The option "Allocate Reserve Time" further contains options: "All" which specifies allocation of all the reserve time and "Part" which allows the operator to specify the amount of time to be allocated out of the reserve time. If "Part" is selected, the operator is supposed to further specify the time ("Minutes") to be allocated.

Incidentally, it is assumed here that there is a reserve time. If there is no reserve time, the reserve time options are not displayed.

When the radio button for any of the options shown in FIG. 18 is clicked and "Enter" is clicked (if "Allocate Reserve Time" and "Part" are selected, the amount of time to be allocated should be further specified before clicking "Enter"), a process corresponding to the selected option is carried out. Specifically, if "Close Agenda Item" is selected, the agenda item is closed (step sa23 in FIG. 6), if "Allocate Reserve Time" is selected, the reserve time is allocated (step sa25 in FIG. 7), if "Leave Till Last" is selected, the current agenda item is postponed till last (step sa21 in FIG. 6), and if "Change Agenda Settings" is selected, the agenda item is changed (step sa27 in FIG. 7).

FIG. 19 is a diagram showing an exemplary screen brought up if "Allocate Reserve Time" and "All" are selected in FIG. 18.

In FIG. 19, the time allocated to agenda item B has been changed from 60 minutes shown in FIG. 16 to 90 minutes by the addition of 30 minutes shown in FIG. 16 and the reserve time has been changed to zero.

FIG. 20 is a diagram showing an exemplary screen brought up if "Leave Till Last" is selected in FIG. 18.

Here, the agenda item B is postponed till last and the conference moves on to agenda item C.

FIG. 21 is a diagram showing an exemplary screen brought up if the reserve time of 30 minutes shown in FIG. 19 is given to agenda item B to continue deliberation of agenda item B for 90 minutes, but the deliberation of agenda item B does not end even after all the 90 minutes including the reserve time of 30 minutes is used up.

Here again, as the scheduled time has elapsed, the alarm message "Scheduled time has elapsed" and options are displayed as in the case of FIG. 18. However, since the reserve time is zero, the "Allocate Reserve Time" option is not displayed.

If "Change Agenda Settings" is selected and "Enter" is pressed, an agenda change screen (not shown) appears, allowing the operator to change agenda settings (step sa27 in FIG. 7). In this example, settings can be changed multiple times and a plan is drawn up again after each setting change. That is, if agenda settings are changed multiple times, multiple plans are drawn up. In this example, possible changes include changes in the minimum guaranteed time, normally requested time, and priority of the remaining agenda items as well as changes in the allocated times of agenda items from the normally requested time to the minimum guaranteed time and vice versa. A change of priority to zero is regarded as instructions for deletion from the agenda.

The number "⅓" on the screen indicates that the plan (draft) displayed here is the first of three plans (drafts) which have been drawn up. Clicking an Up or Down arrow displays the previous or next plan (draft) (however, ⅓ means that no previous plan exists in this case).

When any of the plans (drafts) is displayed, pressing the "Enter" on the screen of the plan (draft) causes the plan (draft) to be adopted as a new plan.

FIG. 20 shows a screen brought up when a plan is drawn up again by following an instruction to change the allocated time of an agenda item D to the minimum guaranteed time (20 minutes). The allocated time of agenda item D has been changed to the minimum guaranteed time of 20 minutes and the reserve time has been changed to 40 minutes instead. This secures reserve time. When "Enter" is pressed, the screen changes to the one shown in FIG. 18, containing the "Allocate Reserve Time" option.

FIG. 22 is a diagram showing another exemplary screen similar to the one shown in FIG. 21.

The lower part of FIG. 22 shows an exemplary screen displayed when agenda item C has been deleted from the agenda list because its priority has been set to zero. As agenda item C is deleted, 20 minutes is laid aside as a reserve time.

As described above, by using the minimum guaranteed times and normally requested times specified for individual agenda items skillfully, the present embodiment can control the progress of an actual conference flexibly.

What is claimed is:

1. A conference management assistance apparatus which assists progress of proceedings, comprising:
an information accepting section which accepts necessary information needed for scheduling of a conference, the necessary information containing a scheduled time of the conference in entirety as well as minimum guaranteed time which needs to be secured at the minimum and desired, normally requested time for each subject to be addressed;
a schedule planning section which plans a schedule for the conference based on the necessary information accepted by the information accepting section; and a schedule management section which measures the time from the start of discussion of the subjects addressed at the conference and gives a notice when a scheduled discussion end time of a subject under discussion comes according to the schedule planned by the schedule planning section and when the scheduled discussion end time of the subject under discussion comes, the information accepting section selects whether to terminate discussing the subject under discussion and if the discussion is to be continued, the information accepting section accepts modification of the necessary information which has already been accepted by the information accepting section, said schedule planning section replanning a subsequent schedule for the conference in progress based on the modification of the necessary information.

2. The conference management assistance apparatus according to claim 1, wherein:
the information accepting section further accepts input of priority of time allocation for each subject to be addressed; and
the schedule planning section allocates the normally requested times to the subjects in descending order of priority among the subjects to be addressed at the conference according to the priority accepted by the information accepting section within the scheduled time of the entire conference and allocates the minimum guaranteed times to the remaining subjects to be addressed at the conference other than the subjects to which normally requested times are allocated.

3. The conference management assistance apparatus according to claim 1, wherein:
the information accepting section further accepts input of the order in which the subjects will be addressed at the conference; and
the schedule planning section plans a schedule according to the order at the conference, accepted by the information accepting section.

4. The conference management assistance apparatus according to claim 1, comprising a schedule display section which displays the schedule planned by the schedule planning section.

5. The conference management assistance apparatus according to claim 1, wherein:
the information accepting section accepts a plurality of modifications of the necessary information which has already been accepted by the information accepting section;
the schedule planning section replans a plurality of schedules corresponding to the plurality of modifications of the necessary information; and
the information accepting section further allows selection from the plurality of replanned schedules.

6. A conference management assistance program that runs on a computer and makes the computer operate as a conference management assistance apparatus for assisting progress of proceedings and comprising:
an information accepting section which accepts input of necessary information needed for scheduling of a conference, the necessary information containing a scheduled time of the conference in entirety as well as minimum guaranteed time which needs to be secured at the minimum and desired, normally requested time for each subject; and
a schedule planning section; and a schedule management section which measures the time from the start of discussion of the subjects addressed at the conference and gives a notice when a scheduled discussion end time of a subject under discussion comes according to the schedule planned by the schedule planning section and when the scheduled discussion end time of the subject under discussion comes, the information accepting section selects whether to terminate discussing the subject under discussion and if the discussion is to be continued, the information accepting section accepts modification of the necessary information which has already been accepted by the information accepting section, said schedule planning section replanning a subsequent schedule for the conference in progress based on the modification of the necessary information which plans a schedule for the conference based on the necessary information accepted by the information accepting section.

7. The conference management assistance program according to claim 6, wherein:
the information accepting section accepts input of priority of time allocation for each subject to be addressed; and
the schedule planning section allocates the normally requested times to the subjects in descending order of priority among the subjects to be addressed at the conference according to the priority accepted by the information accepting section within the scheduled time of the entire conference and allocates the minimum guaranteed times to the remaining subjects to be addressed at the conference other than the subjects to which normally requested times are allocated.

8. The conference management assistance program according to claim 6, wherein:
the information accepting section further accepts input of the order in which the subjects will be addressed at the conference; and
the schedule planning section plans a schedule according to the order at the conference, accepted by the information accepting section.

9. The conference management assistance program according to claim 6, wherein the computer operate as a conference management assistance apparatus comprising a display section which displays the schedule planned by the schedule planning section.

10. The conference management assistance program according to claim 6, wherein:
the information accepting section accepts a plurality of modifications of the necessary information which has already been accepted by the information accepting section;
the schedule planning section replans a plurality of schedules corresponding to the plurality of modifications of the necessary information; and
the information accepting section further allows selection from the plurality of replanned schedules.

* * * * *